May 27, 1958  C. H. O. BERG  2,836,465
SOLIDS CONVEYANCE PROCESS AND APPARATUS
Filed Nov. 3, 1955
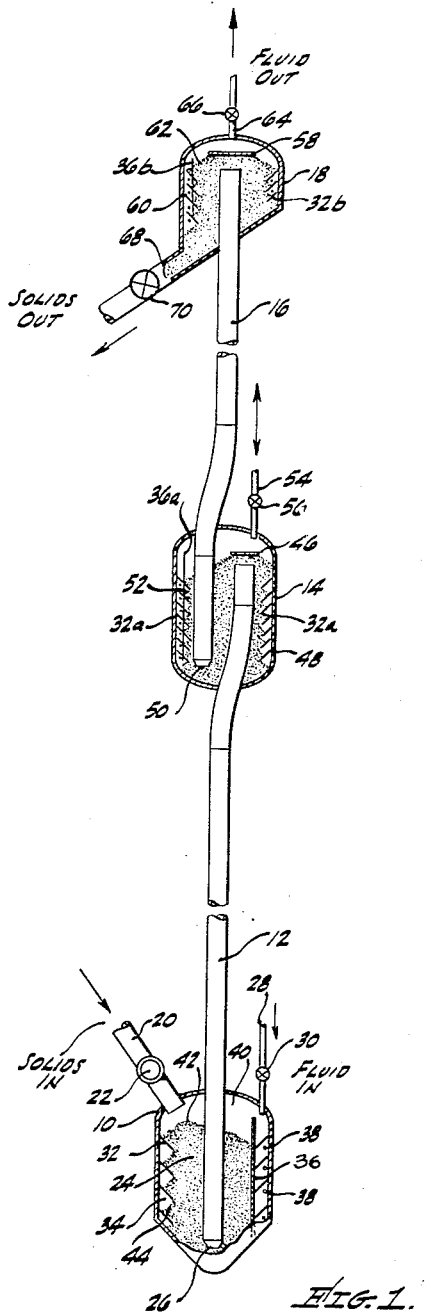
INVENTOR.
CLYDE H. O. BERG,
BY
ATTORNEY.

United States Patent Office 2,836,465
Patented May 27, 1958

2,836,465

SOLIDS CONVEYANCE PROCESS AND APPARATUS

Clyde H. O. Berg, Long Beach, Calif., assignor to Union Oil Company of California, Los Angeles, Calif., a corporation of California Application November 3, 1955, Serial No. 544,679

12 Claims. (Cl. 302—53)

This invention relates broadly to an improved method and apparatus for the conveyance of granular solids and relates more particularly to the improved type of solids conveyance wherein granular solids flow through a conduit in the form of a continuous elongated dense fluid-permeable mass concurrently with a flow of conveyance fluid. Specifically this invention relates to an improved method and apparatus for the engaging and disengaging of the fluids from the solids being conveyed when such solids are relatively finely divided.

A considerable number of processes now involve the continuous conveyance and recirculation of large quantities of granular solids of varying degrees of fineness at high rates, some approaching 1,000 tons per hour. Among the examples of such operations are included the Fluid Catalytic Cracking (F. C. C.) and other fluidized solids processes, those processes involving moving beds of granular solids including those in which the solids are relatively noncatalytic such as the various thermal coking and cracking operations as well as those in which the solids are catalytic as in the Thermofor Catalytic Cracking (T. C. C.) process, continuous catalytic reforming processes, catalytic desulfurization processes and continuous gas separation processes involving selective adsorption of gaseous constituents on a granular adsorbent.

In all of these processes relatively large quantities of granular solids are passed through treating vessels and recirculated at relatively large flow rates. Invariably, due to abrasion and attrition and perhaps impact of one solid particle against another, the solid particles are slowly reduced in size with the formation of solid fines. These are often undesirable in the process since they exert a detrimental effect upon fluid-solids contact operations. Perhaps the most well known detrimental effect attributed to the presence of solids fines in fluid-solids contact operations is that of channelling. The fines tend to accumulate in the interstices between the solid particles thereby increasing the fluid pressure drop through that part of the mass of granular solids. The flowing fluid naturally will follow the course of least resistance which is that where the pressure drop is the least and usually where the concentration of the solids fines in the mass of solid particles is the least. The resuts of such channelling are well known, the foremost of course being poor contact of fluid with the solids and this means in catalytic processes poor utilization of the catalytic ingredient, ineffective conversion of treatment by the catalyst as part of the fluids pass through and low quality products.

Fines also exert a serious effect upon catalyst regenerations in which channelling through a mass of moving catalyst or other granular solids being regenerated causes incomplete regeneration of a certain proportion of the solids. Such partial regeneration is reflected in decreased conversion in the reaction part of the process.

The formation of solids fines is well known to be relatively high in those recirculatory processes wherein the solids are conveyed in the process in bucket elevators or by means of the gas lift conveyance system in which the solids are mixed in a flowing fluid and pumped or blown through an elongated conduit in the form of a suspension. The improved process in which the present invention is a further improvement substantially completely eliminates fines formation because the granular solids move at low velocity as a dense compact mass and are thus unable to impact each other and the inner walls of the conveyance apparatus at high velocity thereby eliminating solids attrition.

In the dense phase type of solids conveyance hereinafter more fully described the conveyance fluid must be engaged with and disengaged from the dense mass of granular solids being conveyed. With the relatively larger sizes of solids such as above about 10 mesh the fluid permeability of the dense solids mass is sufficiently high and the mass of individual granules is great enough so that the fluids may be relatively easily engaged with and disengaged from the solids mass. However with granular solids smaller than about 10 mesh the fluid permeability of the moving mass is relatively low whereby undesirably high pressure drops may be encountered in the mass of solids submerging the inlet of the conveyance zone. The individual granules are so light that undesirably large disengaging areas are required adjacent the outlet of the conveyance zone where the conveyance fluid is disengaged from the conveyed solids so as to avoid suspending the fine solids and carrying them out with the disengaged fluid.

The present invention therefore is specifically directed to an improved method and apparatus for engaging conveyance fluid with and disengaging conveyance fluid from relatively fine granulated solids conveyed in substantially compact form through elongated conveyance conduits.

It is therefore a primary object of this invention to provide an improved method for the conveyance of solids through conduits while maintaining them in substantially compact form, that is, substantially at their static bulk density.

It is a specific object of this invention to provide in this conveyance process an improved method and apparatus for engaging and disengaging the conveyance fluid with and from the relatively fine granular solids being conveyed.

It is a particularly object of this invention to provide an improved method for distributing the conveyance fluid throughout the mass of fine solids to be conveyed submerging the inlet of the conveyance conduit and for disengaging the conveyance fluid from the mass of fine solids submerging the outlet of a dense phase conveyance conduit.

It is also an object of the present invention to provide an improved apparatus for accomplishing the aforementioned objects.

Other objects and advantages of this invention will become apparent to those skilled in the art as the description and illustration thereof proceed.

Briefly the present invention comprises an improved process and apparatus for the conveyance of granular solids through elongated conveyance conduits by means of a concurrently depressuring conveyance fluid, either gaseous or liquid, while maintaining the moving solids as a dense, elongated, continuous, fluid-permeable mass having substantially the same bulk density as the static bulk density of these solids when at rest. To accomplish this type of conveyance and to prevent the granular solids from being fluidized or suspended in the conveyance conduit, several essential requirements must be met. These several requirements are briefly discussed below.

The elongated conveyance zone or conduit is provided with a zone or means for submerging its inlet opening in a dense mass of solids to be conveyed. This solids accumulation is maintained by adding solids to be conveyed to the accumulation at a rate substantially equal to the rate at which the solids are being conveyed in those instances in which the granular solids are being conveyed continuously. In batch-wise conveyance processes, this accumulation may constitute a reservoir of solids to be conveyed and the conveyance is continued so long as the accumulation of solids submerges the inlet opening. In either case during this type of conveyance the inlet opening of the conveyance conduit is submerged in and below the level of a moving dense mass of granular solid material.

The elongated conveyance zone is maintained completely full of solids in the form of a dense fluid-permeable mass of granular solids which moves through the conveyance zone from the accumulation submerging its inlet. The forces tending to resist movement of the mass of solids present in the conveyance zone are overcome and a positive force in the desired conveyance direction is generated throughout the length of the conveyance zone by passing a controlled flow of conveyance fluid through the interconnected interstices of the fluid-permeable solids mass. The forces tending to resist solids flow are primarily those of gravity and of friction against the inside walls of the conveyance zone. The resisting force of gravity is equal to $\rho_s \cos \theta$, wherein $\rho_s$ is the bulk density of the solids mass in pounds per cubic foot and $\theta$ is the deviation of the conveyance from a vertical upward reference axis. The operating pressures at the inlet and the outlet of the conveyance zone are adjusted so as to maintain a flow of fluid concurrently with the solids at a value sufficient to generate a pressure gradient $$\frac{dp}{dl}$$

pounds per square foot per foot throughout the length of the conveyance zone which exceeds the value of $\rho_s \cos \theta$. This is the conveyance force which overcomes the opposing force of gravity and which also overcomes the opposing frictional forces when the pressure gradient is sufficiently greater than the gravitational forces. The ratio of the conveyance force to the opposing gravitational force is:

$$\frac{\frac{dp}{dl}}{\rho_s \cos \theta}$$

and this is the conveyance force ratio. The conveyance fluid flow is maintained at a sufficiently high rate so that the conveyance force ratio throughout the conveyance zone is greater than 1.0. The actual operating ratio exceeds 1.0, typical value being between about 1.01 and 2.0, these values generally being sufficient to also overcome the opposing frictional forces. This generates within the conveyance zone a conveyance force sufficient to permit solids movement in the form of a dense mass so long as the other essential requirements are met.

In order to maintain the moving solids in the form of a dense compact mass during conveyance, a flow restriction or thrust force is applied at the outlet of the conveyance zone against the mass of discharging solids. This may be done by discharging this mass of solids against a thrust plate or wire mesh disposed just opposite the outlet opening of the conveyance zone, or by discharging this solids mass against the roof or wall of a solids receiving zone, and by controlling the rate of withdrawal of discharged solids from such a solids receiving zone so as to maintain another accumulation of compact solids which submerges the outlet opening of the line. A means for controlling the rate of withdrawal of discharged solids from around the outlet opening of the conveyance zone is provided. When the thrust plate or wire mesh etc. means are provided the mass of discharged solids is ordinarily smaller since the plate may be disposed closer to the conveyance zone outlet than the distance between the outlet and the upper level of a submerging mass of granular solids when no plate is employed. In any event the mass of discharged solids reverses its direction at the outlet of the conveyance zone, flows downwardly by gravity in the form of a moving solids accumulation in the solids receiving zone, and then through some solids flow control means. This restriction applied against the moving solids serves to keep the solids in the form of a dense compact mass and to prevent solids suspension or fluidization. It exerts however substantially no restriction against the flow of conveyance fluid.

The foregoing are the essential requirements for the conveyance of granular solids in the form of a continuous moving dense mass.

As will be seen from the foregoing, the conveyance fluid necessarily is engaged with the solids to be conveyed at the inlet of the conveyance zone and is disengaged from the mass of solids at the outlet. In each case this is accomplished in a suitable enclosing vessel within which the accumulations at the outlet and the inlet are confined. The present invention as previously stated is directed to an improved process for effecting these engaging and disengaging steps at the inlet and the outlet of the conveyance zone.

This is accomplished by providing within these zones a plurality of baffles superimposed above one another and encircling the vertical axis passing through either the inlet or the outlet opening of the conveyance zone. These baffles are disposed around the inner wall of the vessel which confines the moving solids accumulations at the inlet and the outlet of the conveyance zone and are thus disposed at the periphery of the accumulation. The preferred form of these baffles comprises a downwardly and inwardly sloping ring which when combined with the other baffles forms a "louvered" type of structure whereby the accumulation of solids moves downwardly within the baffles. An inlet or an outlet for fluid communicates by means of a header zone with each gas space beneath each of the baffles. In this way a considerably extended solids-fluid surface is generated within each of the solids accumulations forming a relatively short flow path to the conveyance zone inlet or from the conveyance zone outlet through the solids accumulation for the conveyance fluid. By this means the problems previously mentioned with respect to fluid handling in the presence of finely divided solids are solved and conveyance fluid flowing at relatively high velocities is readily engaged with and disengaged from moving masses of fine solids.

Typical of such fine solids are carbon black, powdered material such as talc, flour, and the like, and the commonly used powdered catalysts which are utilized in the so-called "fluid" or "fluidized" contacting processes.

Solids are generally conveyed in dense compact form through a single conveyance zone from a high pressure inlet to a relatively low pressure outlet. Solids may also be conveyed through two or more serially connected conduits having an intermediate pressuring zone. In the latter case the operating pressure of the inlet and the outlet of the over-all conveyance zone may be maintained at equal values while the pressure of the intermediate pressuring zone is alternately raised above and dropped below this value in order to effect an intermittent solids conveyance. In either of these cases the improved process and apparatus of this invention are applicable because in each case the conveyance fluid must be engaged with and disengaged from the fine solids.

The present invention will be more readily understood by reference to the accompanying drawings illustrating the process and apparatus of this invention and in which Figure 1 is an elevation view in partial cross section of an apparatus for the conveyance of dense or compact granular solids, Figure 2 shows an elevation view in cross section of the induction zone by means of which the granular solids are introduced into the lift line, and Figure 3 shows an elevation view in cross section of an intermediate pressuring vessel which may be disposed along the length of the lift line for the relay of granular solids therethrough.

Referring now more particularly to Figure 1 the improved conveyance apparatus of this invention is provided with induction chamber 10, lower conveyance zone 12, intermediate pressuring chamber or zone 14, upper conveyance zone 16, and solids receiving-separating zone 18. The modification shown is the second modification described above in which an intermediate pressuring zone is used for intermittent solids conveyance. If continuous conveyance is employed with a pressure differential between the inlet and outlet of the line held at a constant value then intermediate pressuring zone 14 can be substituted with solids receiving zone 18 to form a single conduit. In either case the apparatus at the inlet and the outlet of the lift line remains the same.

Solids to be conveyed are introduced by gravity through inlet conduit 20 controlled by means 22. With intermittent solids conveyance, means 22 may comprise a shutoff valve whereas with continuous conveyance means 22 may comprise a commercially available solids feeding device such as a rotary star feeder adapted to convey solids in one direction against an opposing pressure gradient without the flow of gas countercurrent to the solids. The solids to be conveyed form a compact downwardly moving accumulation 24 which submerges the lower inlet opening 26 of lower conveyance zone 12. A conveyance fluid is introduced under pressure by means of inlet line 28 at a rate and pressure controlled by valve 30.

Disposed around the inside walls of induction chamber 10 is a plurality of downwardly and inwardly inclined baffles 32 forming therebelow a plurality of superimposed empty spaces 34 from which the solids flow is excluded by the baffles. A vertical manifold 36, which may comprise an angle or semi-cylindrical conduit, is disposed within chamber 10 and provided with a plurality of apertures 38 opening therefrom into empty spaces 34 at those points at which the manifold intersects with the superimposed baffles. This communicates each of the empty spaces 34 with the upper gas space 40 existing within chamber 10 above solids level 42.

The conveyance fluid introduced through line 28 enters gas space 40 and is distributed uniformly around the downwardly moving accumulation of solids 24 by flowing through manifold 36 and apertures 38. The gas flows therefrom below each of baffles 32 through the greatly increased exposed solids levels 44. This also minimizes the average length of the fluid flow path from the point of fluid engagement with the solids to inlet opening 26 at the bottom of lower conveyance zone 12.

The conveyance fluid and the granular solids flow concurrently from accumulation 24, downwardly around and upwardly into opening 26, and then concurrently through lower conveyance zone 12 into intermediate pressuring zone 14. The solids are maintained as an upwardly moving compact fluid-permeable mass by the means described above and in this case thrust plate 46 is provided against which the solids mass is discharged from line 12. The discharged solids form downwardly moving accumulation 48 which submerges lower inlet opening 50 of upper conveyance zone 16. Solids level 52 exists within vessel 14 through which the conveyance fluid is disengaged and removed through line 54 controlled by valve 56. An equivalent internal structure consisting of baffles 32a and manifold 36a is installed within intermediate pressuring chamber 14 corresponding to those shown at the bottom of Figure 1 in induction vessel 14. The gas flow in such a case however is just the reverse, that is, it is disengaged from the accumulation 48 into the solids-free space below the baffles, then through this gas space into the manifold zone and therethrough into the upper part of chamber 14. A baffled intermediate pressuring chamber is detailed in Figure 3 described below.

The solids flow as just described continues until, in the intermittent solids flow modification, accumulation 24 is depleted and accumulation 48 is filled approximately to capacity. At this point fluid is introduced under pressure through line 54 and is engaged with the solids in accumulation 48 and flows concurrently therewith upwardly through upper lift line or conveyance zone 16 into solids receiving zone 18. The solids during this conveyance are maintained at their static bulk density by discharge of the mass directly against second thrust plate 58 forming a downwardly moving solids accumulation 60. The conveyance fluid is disengaged from the solids through solids interface 62 and is removed therefrom through line 64 controlled by valve 66. Preferably solids-receiving chamber 18 may also be provided with the baffles 32b and manifold 36b just as shown in induction zone 10 in order to assist in disengaging conveyance fluid from the conveyed solids mass 60. The conveyed granular solids flow downwardly by gravity and are removed through line 68 at a rate controlled by valve 70.

In the continuous modification of the present invention and in which lower conveyance zone 12 is directly connected to upper conveyance zone 16 and in which intermediate pressuring zone 14 is eliminated the solids flow continuously through means 22 at a control rate sufficient to maintain downwardly moving accumulation 24 in induction zone 10. The conveyance fluid passes through line 28, manifold 36, and into the plurality of surrounding gas spaces existing immediately below baffles 32. The gas then flows as before but continuously downwardly through accumulation 24 and concurrently with the solids upwardly through a conveyance conduit consisting of a single pipe as though conduits 12 and 16 were axially connected into solids receiving chamber 18. The conveyance fluid is disengaged as before but continuously and the solids flow downwardly through accumulation 60 and are removed therefrom continuously through flow control means 70.

Referring now to Figure 2 an elevation view similar to induction zone 10 employed in Figure 1 is shown. The induction zone in Figure 2 is disposed at the lower end of the lift line and serves to introduce solids thereinto. Line 80 controlled by valve 82 serves to introduce granular solids into induction chamber 84. Lift line 86 extends downwardly through induction chamber 84 terminating at the lower extremity thereof as restricted opening 88. A longitudinal header 90 open at its upper and lower extremities is disposed along one side of induction zone 84 and is provided with lift gas inlet 92. Around the inside surface of induction chamber 84 is disposed a series of baffles 94 which slope downwardly and inwardly toward the vertical axis of the chamber. Each of these baffles is provided with an opening 96 into header 90. Lift gas introduced through line 92 passes throughout the length of header 90 and is introduced uniformly into the mass of solid material contained within induction chamber 84. The use of such baffles minimizes the lift gas pressure drop existing between lift gas inlet 92 and lift line opening 88. Header 90 may comprise one-half of a tube welded longitudinally along the inside of induction chamber 84. The operation of the induction chamber shown in Figure 2 is intermittent, no lift gas being introduced while valve 82 is open and the solids are entering. When the chamber is full of solids valve 82 is closed and the lift gas pressure is increased by the introduction of lift gas through opening 92 which causes the flow of solids from chamber 84 through opening 88 into and through lift line 86.

Of course with the substitution of a rotary star feeder or a similar type of apparatus for valve 82 thereby permitting the continuous introduction of solids to be conveyed, then the operation of the induction chamber shown in Figure 2 may be made continuous as previously described in connection with Figure 1. Figure 2 is actually an enlarged detail drawing of the structure shown at the bottom of Figure 1.

Referring now more particularly to Figure 3, an elevation view and cross section of an intermediate pressuring vessel such as that described and shown as vessel 14 in Figure 1 is given. The intermediate pressuring vessel consists of vessel 100 provided with longitudinal lift gas header 102 provided with lift gas inlet line 104. A series of downwardly inwardly sloping baffles 106 is provided for the distribution of the entering lift gas and for the collection of the leaving seal gas. Header 102 is open at its upper and lower ends.

Solids are introduced by means of a concurrently depressuring lift gas through lower lift line 108, and are thrust against thrust plate 110 consisting in this modification of a ¾" wire mesh adjacent the upper opening of the lift line. The lift gas disengages from the solids thus delivered and is removed via line 104. The solids subsequently pass from tray 112 via tubes 114 into the main body of solids in the vessel.

Solids are removed via upper lift line 116, which terminates adjacent the lower extremity of intermediate pressure vessel 100 in opening 118, by pressuring up vessel 100 with lift gas via line 104.

In operation the gas pressure within intermediate pressuring vessel 100 is alternately raised and lowered above and below the main operating pressure of the vessel or vessels through which the solids are circulated. When the vessel is depressured due to a removal of gas through line 104, a seal gas passes downwardly through upper lift line 116 while the concurrent flow of solids is prevented since the velocity of this seal gas in passing through annular space 120 between the lower walls of depressured intermediate pressuring vessel 100 and the lower part of upper lift line 116 is insufficient to lift the solids. At the same time a concurrent flow of lift gas upwardly through lower lift line 108 conveys solids therewith and introduces them into vessel 100 until the vessel is substantially full. Subsequently by depressuring the depressured vessel a seal gas flows downwardly through lower lift line 108 while the downward flow of solids is prevented similarly. An upward flow of lift gas through upper lift line 116 removes solids from the annular space 120 and thereby empties the vessel. By connecting lower lift line 108 to the bottom of a vessel and upper lift line 116 to the top of a vessel in a well-known manner, the continuous pressuring and depressuring of vessel 100 as described effects an intermittent flow of granular solids from the bottom to the top of the vessel through which the solids are desired to be passed. For a continuous flow at least two such pressuring vessels are required each of which has an upper and a lower lift line.

In the operation just described above in connection with Figure 3 and particularly in that portion which describes the removal of gas through line 104 when the vessel 100 is depressured and when solids are entering through line 108, is also described an apparatus and an operation directly suitable for the disengagement and removal of conveyance fluid at the top of the conveyance apparatus shown in Figure 1. Such a device may be directly substituted for solids receiving chamber 18 with the only modifications being the elimination of upper lift line 116 and the provision of a valved outlet line for controlled gravity flow of solids from the bottom of the vessel 100 shown in Figure 3.

A modification of the structures shown in Figures 2 and 3 may be made in those cases wherein considerably increased solids flow rates are desirable and this consists in the substitution of an arcuate conduit section disposed externally to the vessels 84 or 100 and which opens directly from the lowest point in such vessels at one end and connects to the upper lift line at the other end. In this modification that portion of the upper lift line 86 or 116 which passes through the wall of vessel 84 or 100 and passes downwardly therein to a low point within the vessel may be eliminated. Solids flow rates of as much as 1500% more than the corresponding maximum flow rates for the modifications shown in Figures 2 and 3 may be realized in this manner. In either modification however the inlet opening of the solids conveyance zone is submerged in a dense mass of solids to be conveyed.

As an example of an apparatus constructed according to this invention the following data are given. The conveyance zone consisting of 2" nominal steel pipe and the total height was 40 feet. The induction chamber had a diameter of 12 inches, a height of 20 inches, and was provided with a plurality of six superimposed angular baffles of the type shown in the drawings which sloped downwardly and inwardly at about 45° for a distance of 2 inches. The gas manifold consisted of one-half of a 4 inch tube welded vertically along the inside surface of the induction chamber and communicated through 1 inch diameter holes with a point just below the juncture of the inclined baffle, the manifold and the induction chamber wall. The intermediate pressuring zone was also 12 inches in diameter and was 36 inches high, was provided with a superimposed plurality of 10 internal baffles constructed as just described in connection with the induction chamber. It served alternately for the engagement and disengagement of conveyance fluid. The solids receiving zone was cylindrical and 12 inches in diameter with a height of about 20 inches. It also was provided with a plurality of internal 45° baffles as were the induction and intermediate pressuring chambers. The device was operated in the conveyance of powdered cracking catalyst using flue gas as the conveyance medium and at a rate of approximately 8400 pounds per hour. The pressure differential between the induction and the solids receiving zones was zero and the intermediate pressuring zone 14 was pressured and depressured between pressures which were an average of 9 p. s. i. g. above and below an operating pressure of 10 p. s. i. g. which was maintained in the induction and solids receiving zones. In other words, the pressure extremes of the intermediate pressuring zone were 1 and 19 p. s. i. g. The conveyance gas was engaged and disengaged very readily from the powdered solids without suspension and carry-over of the solid material with the disengaged fluid. The removal of conveyance gas in the improved structure of this invention was found to be approximately 900% greater than that possible in similar sized apparatus conveying the identical solid material but from which the internal baffle structure had been eliminated.

The foregoing illustrations are intended to be merely descriptive of various applications in which the process and apparatus of the present invention may be utilized and are not intended as limitations thereof.

It is also to be understood that the conveyance process and apparatus of this invention may be employed with either liquid or gaseous conveyance fluids. Furthermore it is to be understood that the conveyance zones or lift conduits described and illustrated herein are not restricted to flow in any particular direction and horizontal, vertical, and directions disposed at angles from the vertical do not interfere with the efficiency nor the operability of the lift line described. The conveyance conduit in which granular solids are transferred in compact form at their static bulk density may be used for lifting of solids, the transfer of solids over relatively long horizontal distances, or a combination of the two in which a lateral as well as a vertical transfer are included.

In the present specification the term "substantially compact in fluidized form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64% [1]) and the greatest bulk density (about 41.5% greater) when uniformly packed with particle centers coinciding with the apexes of a tetrahedron (rhombohedral packing — pore volume 29.95% [1]). The bulk density of solids during conveyance according to this invention is intermediate between the bulk densities of solids uniformly packed according to the foregoing systems and is apparently a random mixture of several packing geometries. Similar density variations occur in packings of nonuniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25. |
| Conduit attitude | Vertical. |
| Conduit diameter, inches: | |
|    Inlet | 3.068. |
|    Outlet | 4.000. |
| Conveyance fluid | Air. |
| Solids mesh size | 4–10. |
| Solids flow rate, lb./hr | 4,500. |
| Solids vibrational bulk density lb./cu./ft | 46.7. |

Upon depressuring the conveyance fluid from the bottom of the conduit while preventing further introduction of solids thereinto, it was noted that the solids level dropped only 0.25 foot from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient or as a check determination the operating bulk density may also be determined by depressuring the conduit as above, removing the granular solids from the entire conduit, weighing this material and dividing the weight by the volume of the conduit in question.

Another test for determining whether or not the flowing solids are in substantialy compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\left(\frac{dp}{dl}\right)}{\rho_s \cos \theta}$$

(the terms of which are given elsewhere herein). Except in relatively rare cases when the operating bulk density is decreased by an amount approaching 20% of the vibration bulk density $\rho_s$ due to packing rearrangements of the compact solids and the ratio thus determined may be as low as 0.8, the conveyance force ratio as thus calculated exceed 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase their size during operation.

[1] Micromeritics—J. M. Dalla Valle (1943), p. 105.

The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it is also applicable though part of the conveyance path is along a direction outside this solid angle.

This application is a continuation in part of my copending application Serial No. 137,406 filed January 7, 1950, issued on May 1, 1956 as U. S. Patent No. 2,743,814.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for conveyance of granular solids which comprises establishing an intermediate pressuring zone communicating through a first conveyance zone with an induction zone and through a second conveyance zone with a solids receiving zone, introducing solids to be conveyed into said induction zone forming therein a dense accumulation of solids submerging the inlet to said first conveyance zone, introducing a conveyance fluid into said induction zone, passing it therein through a manifold zone into and through each of a plurality of superimposed engaging spaces surrounding said accumulation and into said accumulation; alternately flowing conveyance fluid from an accumulation of solids in said intermediate pressuring zone through a plurality of superimposed solids-free spaces surrounding said last named accumulation and through a manifold zone therein to lower the pressure in said intermediate pressuring zone below that of said induction zone to cause conveyance fluid flow through said first conveyance zone at a rate sufficient to convey said solids concurrently therethrough, and then flowing conveyance fluid through said last named manifold zone and said solids free spaces into said accumulation of solids in said intermediate pressuring zone to raise the pressure therein to a value above that in said solids receiving zone sufficient to cause concurrent flow of fluid and solids through said second conveyance zone; restricting the discharge of solids from said first and second conveyance zones to maintain said solids therein as a compact mass having substantially the solids' static bulk density, removing conveying solids from said solids receiving zone, and flowing conveyance fluid through a plurality of superimposed disengaging spaces surrounding the solids accumulation therein and through a manifold zone from said solids receiving zone.

2. A method according to claim 1 in combination with the steps of maintaining substantially constant pressures in each of said induction and solids receiving zones.

3. A method according to claim 2 wherein said constant pressures are substantially equal.

4. A method for conveyance of granular solids through a conveyance zone through which they would not flow in the same direction under the influence of gravity alone which comprises maintaining a compact accumulation of solids to be conveyed submerging the inlet of the conveyance zone, passing a conveyance fluid through a manifold zone into and through each of a plurality of superimposed engaging spaces surrounding said accumulation and therefrom into said accumulation and through a substantially compact moving bed of solids in said conveyance zone at a velocity sufficient to overcome forces of gravity and friction forces of inner conveyance zone surfaces acting on said bed, discharging said moving bed from the outlet of said conveyance zone, restricting said discharge of said solids to maintain said solids at said outlet and throughout said conveyance zone at a bulk density substantially equal to the static bulk density of said solids when at rest, and disengaging said conveyance fluid from the mass of discharged solids by flowing said fluid through and from said mass into a plurality of superimposed disengaging spaces surrounding said mass and through a manifold zone communicating therewith.

5. A method according to claim 4 in combination with the step of controlling the rate of solids conveyance by controlling the rate at which discharged solids are withdrawn from the mass of conveyed solids surrounding the outlet of said conveyance zone.

6. An apparatus for the conveyance of granular solids which comprises an intermediate pressuring chamber communicating through a first conveyance conduit with an induction chamber and through a second conveyance conduit with a solids receiving chamber, an inlet conduit for solids and an inlet conduit for conveyance fluid opening into said induction chamber, an outlet conduit for solids and an outlet conduit for conveyance fluid opening from said solids receiving chamber, separate means adjacent the outlet openings of each of said conveyance conduits to restrict the discharge of the solids mass therefrom to maintain said solids in each of said conveyance conduits substantially at the solids static bulk density, a plurality of superimposed means disposed around the inner walls of said induction, intermediate pressuring, and solids receiving chambers to provide a plurality of superimposed solids-free spaces therein, a manifold conduit in each of the aforesaid chambers communicating the solids-free spaces therein with each other and with the upper part of said chambers, and means for alternately introducing a conveyance fluid into and removing a conveyance fluid from said intermediate pressuring chambers to effect solids conveyance.

7. An apparatus according to claim 6 wherein said plurality of superimposed means in said chambers comprise a plurality of baffles sloping downwardly and inwardly from the chamber wall, each baffle extending substantially completely around the chamber wall and intersecting said manifold.

8. An apparatus according to claim 7 wherein said manifold is disposed vertically along the inner wall of said chamber throughout the height of said baffles and to a point adjacent the top of said chamber, said manifold being provided with an aperture opening laterally below the intersection of each of said baffles therewith.

9. An apparatus for the conveyance of granular solids which comprises an elongated conveyance conduit, an induction chamber communicating with the inlet and a solids receiving chamber communicating with the outlet of said conveyance conduit, an inlet conduit for solids opening into said induction chamber, an inlet conduit for conveyance fluid opening thereinto, a plurality of superimposed angular baffles disposed on the inner wall of said induction chamber, a manifold conduit communicating with said inlet conduit for fluid and disposed vertically along said inner wall and provided with apertures opening below each baffle, a plurality of superimposed baffles disposed on the inner wall of said solids receiving vessel, an outlet for solids and an outlet for fluid opening from said solids receiving vessel, and a manifold conduit communicating with said outlet conduit for fluid and disposed on the inner wall of said vessel and provided with apertures opening below each of said baffles, the outlet of said conveyance conduit being adapted to restrict the discharge of a solids mass therefrom to maintain solids moving through said conduit as a mass having substantially the solids' static bulk density.

10. An induction chamber for engaging a fluid with a bed of relatively fine granular solids having a relatively low fluid permeability which comprises a closed induction chamber, an outlet conduit for solids and fluid opening at a low point therein, an inlet for solids and an inlet for fluid opening at a high point into said induction chamber, a plurality of baffles superimposed one above the other around the inner surface of the induction chamber wall and adapted to form a plurality of superimposed solids-free spaces below the baffles and surrounding a solids bed in said induction chambers, and a manifold conduit communicating said inlet for fluid with each of said solids-free spaces via a plurality of apertures in said manifold opening below said baffles.

11. A solids receiving and fluid disengaging chamber for disengagement of fluids from a bed of relatively fine granular solids having a relatively low fluid permeability which comprises a solids receiving chamber, a gravity flow outlet conduit for solids opening from the bottom of said chamber, means for controlling solids flow through said conduit, a solids and fluid inlet conduit opening into said chamber and having its outlet opening therein disposed so as to be submerged by a solids bed, a plurality of baffles superimposed one above another around the inner wall of said chamber and adapted to maintain a solids-free space below each baffle and surrounding the solids bed, a manifold conduit communicating via apertures with each of said solids-free spaces and with a high point in said chamber, and an outlet conduit for fluid opening from the top of said chamber for removal of fluid therefrom.

12. An intermediate pressuring vessel for relaying a moving bed of relatively fine solids having a relatively low fluid permeability through an elongated conveyance system which comprises a closed pressuring vessel, a solids delivery conduit opening from a low point in said vessel so as to be submerged by a solids bed therein, a solids inlet conduit opening into the upper part of said vessel, the outlet opening of said inlet conduit being adapted to restrict the discharge of a mass of solids so as to maintain the solids in said conduit as a mass having substantially the solids' static bulk density, a plurality of superimposed baffles disposed around the inner surface of the wall of said vessel and adapted to form a solids-free space immediately below each baffle, a manifold conduit intersecting each baffle and provided with an aperture opposite each solids-free space, and a conduit for introducing and removing fluid into and from, respectively, said manifold whereby the fluid is alternately engaged with and disengaged from a bed of solids in said vessel through the plurality of solids-free spaces.

References Cited in the file of this patent

UNITED STATES PATENTS

| | | |
|---|---|---|
| 705,310 | Seifert | July 22, 1902 |
| 1,571,518 | Foster | Feb. 2, 1926 |
| 1,946,780 | Costello | Feb. 13, 1934 |
| 2,159,352 | Chapman | May 23, 1939 |
| 2,321,885 | Allen | June 15, 1943 |
| 2,666,731 | Bergstrom | Jan. 19, 1954 |
| 2,684,872 | Berg | July 27, 1954 |
| 2,684,928 | Berg | July 27, 1954 |
| 2,686,083 | Hampton | Aug. 10, 1954 |
| 2,707,132 | Baresch | Apr. 26, 1955 |
| 2,724,619 | Berg | Nov. 22, 1955 |